United States Patent [19]

King et al.

[11] Patent Number: 4,609,716

[45] Date of Patent: Sep. 2, 1986

[54] POLY(VINYLIMINOMETHYLENE) FROM VINYL ISOCYANIDE

[75] Inventors: Robert B. King; Lester Borodinsky, both of Athens, Ga.

[73] Assignee: The University of Georgia, Athens, Ga.

[21] Appl. No.: 666,902

[22] Filed: Oct. 31, 1984

[51] Int. Cl.$^4$ .................. C08F 26/02; C08F 126/02
[52] U.S. Cl. ........................... 526/310; 526/90; 528/392; 528/422
[58] Field of Search ................. 526/310, 90

[56] References Cited

U.S. PATENT DOCUMENTS 3,200,087  8/1965  Robinson et al. ............... 526/310
4,062,787  12/1977  Jolivet et al. .................. 526/310

FOREIGN PATENT DOCUMENTS 1575868  6/1969  France .

*Primary Examiner*—Harold D. Anderson

*Attorney, Agent, or Firm*—Oblon, Fisher, Spivak, McClelland & Maier

[57] ABSTRACT

Poly(vinyliminomethylene) homopolymers and copolymers, the homopolymer having the formula:

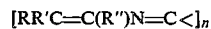

$[RR'C=C(R'')N=C<]_n$ wherein R and R', which are the same or different, are each hydrogen, a $C_1$–$C_8$ alkyl group or a $C_3$–$C_7$ cycloalkyl group which is unsubstituted or substituted by lower alkyl or alkoxy groups, a $C_1$–$C_8$ alkenyl or a $C_5$–$C_7$ cycloalkenyl group which is unsubstituted or substituted by lower alkyl or alkoxy groups, a phenyl group or naphthyl group which is unsubstituted or substituted by lower alkyl or alkoxy groups, with the proviso that at least one of R and R' be a substituent other than hydrogen; R'' is hydrogen; and n has a value such that the molecular weight is in the range of about 2,000 to 400,000. The polymers are useful in the manufacture of electroconductive articles.

6 Claims, No Drawings

POLY(VINYLIMINOMETHYLENE) FROM VINYL ISOCYANIDE

BACKGROUND OF THE INVENTION

1. Field of the Invention

The present invention relates to poly(vinyliminomethylene) polymers. This invention also relates to vinyl isocyanide compounds for the preparation thereof.

2. Description of the Prior Art:

The homopolymerization of isocyanides, RNC, yields a rather unusual class of polymers, namely the poly(iminomethylenes), having the formula $[R-N=C<]_n$. These polymers are of interest as their viscosity behavior, Debye-Scherrer X-ray composites, and optical rotation data suggest that the polymers have a rigid rod helical structure. The same structure appears to be consistent with observations from molecular models. F. Millich, *Adv. Polym. Sci.*, 19, 117 (1975) and *Chem. Rev.*, 72, 101 (1972). With the recognition that a helical structure is the most likely structure, subsequent experimentation soon indicated that various isocyanide oligomers could be resolved into fractions having (+) and (−) signs of optical rotation. R. J. M. Nolte et al, *J. Am. Chem. Soc.* 96, 5932 (1974). Hence, the poly(iminomethylenes) appear to have a chiral helical rigid rod structure.

While various metals have been tested as catalysts for the isocyanide homopolymerization reaction, nickel (II) compounds have emerged as the catalysts of choice for the preparation of poly(iminomethylenes).

The first characterized high polymer of an isocyanide, RNC, and a catalytic synthetic procedure were reported in 1965. However, although some polyisocyanide studies have been conducted, as described above, more extensive investigations of the synthesis and properties of these polymers have been hampered by the extreme insolubility of most of the poly(iminomethylenes). Morever, the polymer insolubilities have largely prevented investigations pertaining to the possible uses for these polymers. With the combination of chirality and rigidity, the poly(iminomethylenes) should offer a wide range of uses such as selective supports in chromatography, as enantioselective catalysts, and as specific reagents with respect to substrates of biochemical importance. Unfortunately, the realization of these possibilities has been frustrated due to the insolubility of the poly(iminomethylenes).

Therefore, a need clearly exists either for a poly(iminomethylene) type polymer which has a dramatically improved solubility or for a closely related soluble polymer which would facilitate the additional study and use of these polymers as described above.

SUMMARY OF THE INVENTION

Accordingly, it is an object of the present invention to provide poly(vinyliminomethylene) polymers which have excellent solubility.

It is also an object of this invention to provide poly(vinyliminomethylene) polymers which have, by virtue of their molecular structure, pendant carbon-carbon double bonds which would permit the formation of highly conjugated conducting materials.

It is also an object of the present invention to provide a process for the preparation of the above poly(vinyliminomethylene) polymers.

Further, it is also an object of this invention to provide vinyl isocyanide compounds for the preparation of the poly(vinyliminomethylene) polymers.

It is also an object of this invention to provide a process for the preparation of the vinyl isocyanide compounds.

According to the present invention, the foregoing and other objects are attained by providing a poly(vinyliminomethylene) homopolymer having the formula:

$$[RR'C=C(R'')N=C<]_n$$

wherein R and R', which are the same or different, are each hydrogen, a $C_1$-$C_8$ alkyl group or $C_3$-$C_7$ cycloalkyl group which is unsubstituted or substituted by lower alkyl or alkoxy groups, a $C_2$-$C_8$ alkenyl group or a $C_5$-$C_7$ cycloalkenyl group which is unsubstituted or substituted by lower alkyl or alkoxy groups, a phenyl group or naphthyl group which is unsubstituted or substituted by lower alkyl or alkoxy groups, with the proviso that at least one of R and R' be a substituent other than hydrogen; R" is hydrogen; and n has a value such that the molecular weight is in the range of about 2,000 to 400,000.

DETAILED DESCRIPTION OF THE PREFERRED EMBODIMENTS

According to one aspect of the present invention it has now been found that vinyl isocyanides, $RR'C=C(R'')NC$, can be homopolymerized with nickel (II) catalysts to give the corresponding poly(vinyliminomethylenes). By an appropriate choice of the vinyl isocyanide monomer, the corresponding poly(vinyliminomethylene) is obtained as a yellow to brown solid which is soluble in chloroform. The polymers can be purified by dissolution in chloroform and reprecipitation with ethanol.

Available infrared (IR) data as well as proton and carbon-13 nuclear magnetic resonance (NMR) data for the poly(vinyliminomethylenes) indicate that the polymerization of the vinyl isocyanide occurs through the isocyanide functionality rather than through the carbon-carbon double bond. Therefore, the poly(vinyliminomethylenes) of the present invention have the structural formula:

$$[RR'C=C(R'')N=C<]_n$$

with pendant carbon-carbon double bonds. This type of structure is extremely advantageous for use in the following applications:

(1) Formation of highly conjugated conducting materials arising from the pendant carbon-carbon double bonds.

(2) Photocrosslinking of soluble poly(vinyliminomethylenes) through the photo-initiated free radical addition reactions of the pendant carbon-carbon double bonds to give insoluble cross-linked materials.

Moreover, as the cross-linked materials would, most likely, be conducting, such materials would be very useful in the manufacture of printed circuits.

(3) The use of the pendant carbon-carbon double bonds as a site for anchoring transition metal functionalities of catalytic interest. This would be a new example of the known non-classical bonding interaction of the π electrons of unsaturated moieties with transition metal orbitals. This would be expected to generate novel polymer-supported catalysts. Indeed, such catalysts could be useful for asymmetric synthesis, if the poly(vinyliminomethylene) were resolved into the pure enantiomers i.e., the right and left-handed helices.

The poly(vinyliminomethylene) homopolymers of the present invention have the structural formula:

$$[RR'C=C(R'')N=C<]_n$$

wherein R and R', which are the same or different, may be hydrogen or an alkyl or alkenyl group of practically any size. However, it is preferable that the alkyl group be a $C_2$-$C_8$ group, which may either be a straight chain or branched-chain alkyl group, or a $C_3$-$C_7$ cycloalkyl group which is unsubstituted or substituted by lower alkyl or alkoxy groups. It is preferable that the alkenyl group be a $C_1$-$C_8$ group, which may either be a straight chain or branched-chain alkenyl group, or a $C_5$-$C_7$ cycloalkenyl group which is unsubstituted or substituted by lower alkyl or alkoxy groups. R and R' may also be an aryl group such as phenyl or naphthyl, both of which may be unsubstituted or substituted by lower alkyl or alkoxy groups. By lower alkyl is meant $C_1$-$C_4$ alkyl radicals such as methyl, ethyl, n-propyl, isopropyl, n-butyl, sec-butyl and tert-butyl. By lower alkoxy is meant $C_1$-$C_4$ alkoxy radicals such as methoxy, ethoxy, n-propoxy, isopropoxy, n-butoxy, sec-butoxy and tert-butoxy.

However, in addition to the above definitions of R and R', it is also necessary that at least one of R or R' be a substituent other than hydrogen.

R" is hydrogen and n has a value such that the polymer molecular weight is in the range of about 2,000 to 400,000. However, it is preferable that n have a value such that the polymer molecular weight is in the range of about 10,000 to 80,000. Moreover, the polymers generally have a polydispersivity (Mw/Mn) in the range of 1.7-2.4. However, polydispersivities as high as 3.9 have been observed.

For the above-described homopolymer, it is more preferable yet that R and R' be a $C_1$-$C_8$ straight chain or branched chain alkyl group or a $C_3$-$C_7$ cycloalkyl group which is unsubstituted or substituted by lower alkyl or alkoxy groups. Of the alkyl substituents, the most preferred groups are methyl, ethyl, n-propyl, isopropyl, n-butyl, sec-butyl or tert-butyl. For the cycloalkyl substituents, cyclopropyl, cyclobutyl, cyclopentyl, cyclohexyl and cycloheptyl may be used, and for the cycloalkenyl substituents, cyclopentenyl, cyclohexenyl and cycloheptenyl may be used.

However, larger alkyl, alkenyl, cycloalkyl and cycloalkenyl groups such as those in the range of 8 to 12 carbon atoms are specifically contemplated as being equivalent to the described groups of the present invention.

As indicated R and R' may also be an aryl groups such as phenyl or naphthyl, both of which may be unsubstituted or substituted by lower alkyl or alkoxy groups. However, particularly preferred is an unsubstituted phenyl group.

The poly(vinyliminomethylene) homopolymers of the present invention are prepared by the polymerization of a vinyl isocyanide compound. The vinyl isocyanide compound starting material can be prepared according to the method of Schöllkopf, *Ann.*, 1977, 1167 as described below according to the following equations:

$$CH_3NC + n\text{-}C_4H_9Li \xrightarrow{THF} LiCH_2NC + n\text{-}C_4H_{10} \quad (1a)$$

$$LiCH_2NC + RR'C=O \rightarrow RR'(OLi)CH_2NC \quad (1b)$$

$$RR'C(OLi)CH_2NC + TsCl \rightarrow RR'C(OTs)CH_2NC + LiCl \quad (1c)$$

(Ts=tosyl=p—toluene sulfonyl)

$$RR'C(OTs)CH_2NC + KOH \rightarrow RR'C=CHNC + H_2O + KOTs \quad (1d)$$

The present inventors have found that this method works particularly well when the carbonyl compound of (1b) is an aldehyde and not a ketone. By using aldehyde carbonyls in this method, competitive elimination reactions appear to be largely avoided. By contrast, such competitive elimination reactions are often a problem when ketones are used.

The preparation of the vinyl isocyanide compounds by this method will now be further illustrated by certain examples and references which are provided for purposes of illustration only are not intended to limit the present invention.

EXAMPLE 1

Preparation of $C_6H_5CH=CH-NC$

Amounts used:
9.21 g $CH_3NC$ (0.224 mol) in 275 ml dry THF
140 ml of 1.6 N n-BuLi(in hexane) (0.224 mol)
24.4 g benzaldehyde (0.230 mol) in 100 ml dry THF The n-BuLi, benzaldehyde/THF, tosyl chloride/THF are flushed with $N_2$ and placed in the freezer to store until needed. All operations in the following procedure were conducted under $N_2$.

$CH_3NC$ is placed in a 2l-3 neck flask, which is fitted with a stirrer, a dropping funnel, and an immersed low-temperature thermometer, with THF. This mixture is cooled to $-78°$ C. and the n-BuLi is added at a rate such that the temperature never rises above $-70°$ C. Then the benzaldehyde/THF mixture is added at a rate such that the temperature never rises above $-70°$ C. Stirring is continued for about 10 minutes more, and the tosyl chloride/THF is dropped in such that the temperature never rises above $-65°$ C. Stirring is continued for an additional 15 minutes and the reaction mixture is allowed to warm to 30°–35° C.

At this temperature is added the KOH/CH$_3$OH solution over a period of about 40 minutes. Stirring is continued for an additional 20 minutes after addition is complete. The mixture is then pumped through a dry-ice trap to remove most of the solvents.

The reaction vessel is then flushed with N$_2$ and opened to the air. About 500 ml of H$_2$O is added, and then about 500 ml of Et$_2$O (diethyl ether). The aqueous layer is washed with about 300 ml of Et$_2$O. The Et$_2$O layers are combined and dried over MgSO$_4$ at about −20° C. for about 1½ hrs. This mixture is then filtered, the MgSO$_4$ is washed with Et$_2$O and then the solvent is pumped through a −78° C. trap.

The remaining liquid is vacuum distilled.

Yield =7.031 g (54.4 mmol) 24.7% of the phenyl vinyl isocyanide.

EXAMPLE 2

Example 1 was repeated except that tert-butyl aldehyde ((CH$_3$)$_3$CCHO) was used as the carbonyl compound in equation (1b) instead of benzaldehyde. A yield of about 75% of the corresponding vinyl isocyanide (CH$_3$)$_3$CCH=CHNC was obtained.

EXAMPLE 3

Example 1 was repeated except that 2,4,6-trimethylbenzaldehyde(2,4,6-(CH$_3$)$_3$C$_6$H$_2$CHO) was used as the carbonyl compound in equation (1b) instead of benzaldehyde. A yield of about 41% of the corresponding vinyl isocyanide (2,4,6-(CH$_3$)$_3$C$_6$H$_2$CH=CHNC) was obtained as a solid which was purified by recrystallization and vacuum sublimation.

EXAMPLE 4

Example 1 was repeated except that 2-methyl-2-buten-1-aldehyde (tiglaldehyde) (CH$_3$=C(CH$_3$)CHO) was used as the carbonyl compound in equation (1b) instead of benzaldehyde. A yield of about 57% of the corresponding vinyl compound (CH$_3$CH=C(CH$_3$)CH=CHNC) was obtained.

EXAMPLE 5

Example 1 was repeated except that phenyl methyl ketone (C$_6$H$_5$COCH$_3$) was used as the carbonyl compound in equation (1b) instead of benzaldehyde. A yield of about 38% of the corresponding vinyl compound (C$_6$H$_5$C(CH$_3$)=CHNC) was obtained.

It is also possible to produce vinyl isocyanide starting materials according to the method of Saegusa et al (Tetrahedron, 1971, 27, 3795) which is particularly useful for preparing vinyl isocyanides of the formula:

wherein R$_a$ and R$_b$, which may be the same or different, are each hydrogen; alkyl of about 1 to 8 carbon atoms, which may straight or branched chain; unsubstituted phenyl or phenyl substituted by lower alkyl or alkoxy; and unsubstituted naphthyl or naphthyl substituted by lower alkyl or alkoxy.

The vinyl isocyanide preparation according to the method of Saegusa et al entails (1) the preparation of an allyl formamide from an allyl amine, (2) the preparation of the allyl isocyanide from the allyl formamide and (3) the preparation, by isomerization, of the vinyl isocyanide from the allyl isocyanide, in accordance with the following equations:

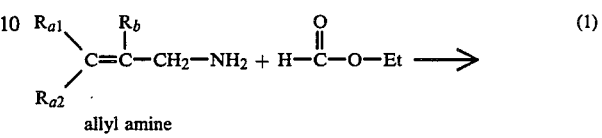

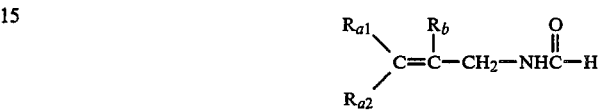

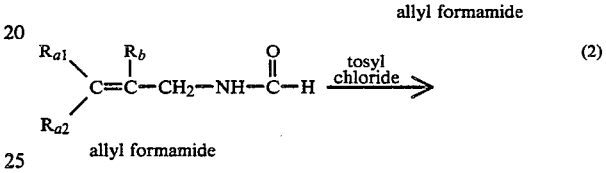

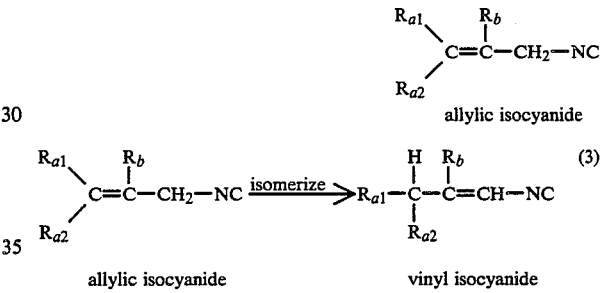

According to the above method, in general, the allyl amine is refluxed with ethyl formate, to form the allyl formamide. Then, the allyl formamide is reacted with tosyl chloride (as defined above) in the presence of a base, such as quinoline, to yield the allylic isocyanide upon elimination. Finally, the allylic isocyanide is isomerized to the corresponding vinyl isocyanide in the presence of a cuprous catalyst, such as cuprous oxide.

In the above equations (1), (2) and (3), R$_{a1}$ and R$_{a2}$ may be the same or different and are each hydrogen; an alkyl group of about 1 to 8 carbon atoms, which may be a straight or branched chain; an unsubstituted phenyl group or phenyl substituted by a lower alkyl or alkoxy of about 1 to 4 carbon atoms; R$_b$ is a straight chain or branched chain alkyl group of about 1 to 8 carbon atoms; an unsubstituted phenyl group or a phenyl group substituted by a lower alkyl or alkoxy of about 1 to 4 carbon atoms.

It is more preferred, however, where R$_{a1}$, R$_{a2}$ and R$_b$ are hydrogen or lower alkyl groups having from about 1 to 4 carbon atoms such as methyl, ethyl, n-propyl, isopropyl, n-butyl, sec-butyl and tert-butyl groups.

However, larger alkyl groups such as those in the range of 8 to 12 carbon atoms are specifically contemplated as being equivalent to the described alkyl groups of the present invention. Moreover, cycloalkyl, alkenyl and cycloalkenyl groups having between 1 and 12 carbon atoms are specifically contemplated as being equivalent to the described substituent alkyl groups of the present invention.

By the above method of the present invention it is possible to obtain vinyl isocyanides which correspond to those which, in theory, could be obtained by using ketones as the carbonyl compounds in the method of Schöllkopf. However, the use of ketones as carbonyl compound starting materials in the Schöllkopf method often gives rise to competitive elimination reactions which significantly affect the yield of vinyl isocyanide product. By the method of the present invention, it is possible to avoid this drawback.

The preparation of vinyl isocyanide compounds by the method of the present invention will now be further illustrated by certain examples and references which are provided for purposes of illustration only and are not intended to limit the present invention.

EXAMPLE 6

(i) Preparation of β-Methallyl formamide

Amounts Used 20.473 g β-methallylamine (288 mmol)
21.261 g ethyl formate (327 mmol)

The above constituents are refluxed for 5 hours. The heat is discontinued and stirring is conducted under $N_2$.

The excess ethyl formate and EtOH (ethyl alcohol by-product) are distilled off at ambient pressure. Then the product is distilled under vacuum $B.P._{1.0\ mm}$ = 84–85° C.

Yield 25.236 g (255 mmol) 88.5%.

(ii) Preparation of β-methallyl isocyanide

Amount Used 25.147 g β-methallyl formamide 253 mmol)
65.0 g tosyl chloride (341 mmol)
125 g quinoline (978 mmol)

The tosyl chloride and quinoline are combined in a 500 ml 2-neck round bottom flask fitted with a greased-joint β-methallyl formamide filled dropping funnel and an outlet. The vessel is first filled with $N_2$ and placed in an oil bath heated to 75° C. The pressure is reduced and the formamide dropped in over about 15 minutes. The effluents are allowed to pass through the reaction vessel outlet and through a −78° C. trap, where the product is collected. This liquid is redistilled to yield β-methallyl isocyanide. B.P.=128°–130° C.

Yield=8.648 g (107 mmol) 44.3%.

(iii) Preparation of the vinyl isocyanide

Amounts Used 8.148 g of β-methallylisocyanide (100 mmol)
0.141 g of $Cu_2O$ (0.985 mmol)

To neat β-methallyl isocyanide, which is stirring under $N_2$, is added cuprous oxide. After about 5 seconds, the reaction mixture turns dark and effervesces in a slow but steady fashion. The reaction apparatus became warm.

The reaction mixture is allowed to stir for about 4 hours. Then the mixture is distilled. B.P.=118°–120° C.

Yield=6.984 g (86.0 mmol)=86.0%.

As indicated above, this method of vinyl isocyanide production is quite advantageous as it provides a method by which certain vinyl isocyanide compounds can be made without the occurrence of competitive elimination reactions to a significant extent.

While cuprous oxide is the cuprous catalyst of choice, other cuprous compounds such as the cuprous halides, CuCl and CuBr, may also be used according to the present invention.

The vinyl isocyanides prepared either by the present method or a conventional method are identifiable by their infrared spectra and their proton and carbon-13 n.m.r. spectra. Of particular interest are the isocyanides having the formulas:

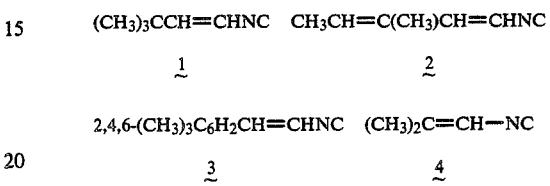

Vinyl isocyanides 1 and 2 and 4 are easily characterized by correct C, H and N analyses on their crystalline cis-$(RNC)_2Mo(CO)_4$ complexes obtained by reactions of the isocyanides with the norbornadiene complex $C_7H_8Mo(CO)_4$ in hexane at room temperature, using the well-known procedure of King, R.B. "Organometallic Synthesis: Volume 1, Transition Metal Compounds," Academic Press, N.Y., N.Y. (1965) p. 124.

The crystalline vinyl isocyanide 3 is easily characterized by correct C, H, and N analyses on a vacuum sublimed sample.

As indicated above, this method of vinyl isocyanide production is quite advantageous as it provides a method by which certain vinyl isocyanide compounds can be made without the occurrence of competitive elimination reactions.

Once the vinyl isocyanide monomer compounds are obtained, either by the present method or a conventional method, the monomers may be either homopolymerized to form a poly(vinyliminomethylene) homopolymer, or they may also be copolymerized with another isocyanide monomer to form a poly(-vinyliminomethylene) copolymer. Of course, the vinyl isocyanide monomer may be polymerized with two other polymerizable monomers to form a terpolymer.

It has been found that the homopolymers of the present invention generally yield soluble polymers having measured molecular weights in the range of about 2,000 to 400,000, more preferably in the range of about 10,000 to 80,000. The homopolymers of the present invention generally have a polydispersivity (Mw/Mn) in the range of 1.7 to 2.4, although polydispersivities as high as 3.9 have been observed.

Nickel (II) derivatives have been found to be effective catalysts for both the homopolymerization and copolymerization reactions. While any of the known nickel (II) derivatives can be used, it is preferred that the nickel (II) derivative be $NiCl_2$; $Ni(acac)_2$, where (acac) represents acetylacetonate; $NiCl_2\cdot 6H_2O$; and $Ni(dpm)_2$, where (dpm) represents dipivaloylmethide. While the nickel (II) derivative catalyst may be employed in the amount of about 0.05 to 2.0 mole % relative to the amount of the isocyanide starting material employed, it is preferred that about 0.5 to 1.25 mole % of the catalyst be used. However, it is most preferred if about 1 mole % of the nickel (II) catalyst is used relative to the isocyanide. Moreover, in polymerizing the vinyl isocyanide compound, alone or with another isocyanide monomer, it is preferred that the monomer or monomers be added to the catalyst. That is, the catalyst is added first to the reaction vessel.

The use of Co(acac)$_2$ rather than Ni(acac)$_2$ under otherwise identical conditions gives a polymer of higher molecular weight but a much lower yield of polymer. In general, it appears that Co(acac)$_2$ is a less active catalyst than Ni(acac)$_2$.

In addition to the use of Ni(dpm)$_2$ and Ni(acac)$_2$ as catalysts, it also appears feasible to use an optically active nickel (II) complex catalyst to preferentially form either left-handed or right-handed poly(vinyliminomethylene) helices from an achiral vinyl isocyanide monomer. One particularly useful catalyst in this regard would appear to be an optically active nickel (II) complex from a chiral β-diketone derived from camphor having the formula:

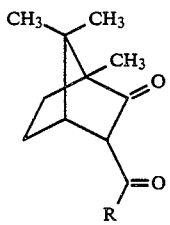

wherein R is (CH$_3$)$_3$C— or C$_3$F$_7$. Such a chiral catalyst could be used in synthesizing chiral polymers for use as catalyst supports in asymmetric synthesis. This would provide a very useful synthesis of chiral polymers requiring only catalytic amounts of the optically active reagent.

While the homopolymers of the vinyl isocyanides are generally soluble in solvents such as chloroform, it has been found that the homopolymerization of 2,4,6-(CH$_3$)$_3$C$_6$H$_2$CH=CHNC and of the dienyl isocyanide CH$_3$CH=C(CH$_3$)CH=CHNC yields insoluble polymers when using the usual nickel (II) catalysts. However, quite surprisingly, it has been found that the copolymerization of these compounds, such as 2, 4, 6-(CH$_3$)$_3$C$_6$H$_2$CH=CHNC, with an approximately equimolar amount of an isocyanide compound having the isocyanide group attached to a tertiary carbon, such as tert-butyl isocyanide yields a soluble copolymer. It appears that in copolymerizing either of the above two monomers with another isocyanide monomer, it is necessary that the latter compound have the isocyanide group attached to a tertiary carbon in order that the formed copolymer be soluble. By approximately equimolar amount is meant about 75 to 125 molar % of the one isocyanide monomer relative to the other.

For example, it has been found that the copolymerization of 2, 4, 6-(CH$_3$)$_3$C$_6$H$_2$CH=CHNC with an equimolar amount of tert-butyl isocyanide using a nickel (II) acetylacetonate catalyst gave a soluble polymer suggested by elemental analysis of C,H and N to consist of about 95% of 2, 4, 6-(CH$_3$)$_3$C$_6$H$_2$CH=CHNC units. Apparently, the role of the tertiary carbon bearing isocyanide is to inhibit the chain growth of the 2, 4, 6-(CH$_3$)$_3$C$_6$H$_2$CH=CHNC polymerization so that the degree of polymerization is prevented from being so high that the polymer is insoluble.

In the few instances where a particular substitution on the vinyl isocyanide does not, upon homopolymerization, result in the production of a soluble poly(vinyliminomethylene), a soluble poly(vinyliminomethylene) copolymer may be obtained by copolymerizing the vinyl isocyanide monomer with an isocyanide having the isocyanide functionality attached to a tertiary carbon. Examples of the latter are tert-butyl isocyanide, tert-pentyl isocyanide and tert-hexyl isocyanide. These are isocyanides bearing tert-butyl, tert-pentyl and tert-hexyl radicals. However, most preferred is tert-butyl isocyanide.

The preparation of the poly(vinyliminomethylene) homopolymers and copolymers will now be further illustrated by certain examples and references which are provided for purposes of illustration only and are not intended to limit the present invention:

EXAMPLE 7

Homopolymerization of (CH$_3$)$_2$C=CH—NC using Ni(dpm)$_2$ as a Catalyst 0.0434 g of Ni(dpm)$_2$ (0.102 mmol) is dissolved in hexane at 0° C. to form a 0.00510 M solution in the hexane. Then, 1.718 g of (CH$_3$)$_2$C=CH—NC (21.2 mmol) is dissolved in 20.0 ml of hexane at 0° C. to form a 1.06 M solution in the hexane. (Thus, the catalyst is added first, then the isocyanide). The hexane is stirred and maintained at 0° C. during addition and that temperature is maintained overnight during reaction. However, it was noted that a precipitate began to form after about 20 seconds and remained in suspension.

After overnight reaction, the reaction mixture is washed with EtOH and filtered. The solid is dissolved in CHCl$_3$ and filtered. The amber solution is reduced in volume. EtOH is added causing a dark yellow precipitate to form. This solid is filtered and suction-dried.

It is noted that, where possible, all procedures were performed at 0° C.

A yield of 1.456 g (84.7%) of polymer product was obtained.

EXAMPLE 8

Homopolymerization of (CH$_3$)$_2$C=CH—NC using Ni(acac)$_2$ as a Catalyst 0.0201 g of Ni(acac)$_2$ (0.102 mmol) is dissolved in EtOH to form a 0.00508 M solution in the EtOH. Then, 1.657 g of (CH$_3$)$_2$C=CH—NC (20.4 mmol) is dissolved in 20.0 ml of EtOH at 0° C. to form a 1.02 M solution in the EtOH. The EtOH is stirred and maintained at 0° C. during addition and that temperature is maintained overnight during reaction. However, it was noted that a precipitate began to form after about 30 seconds and a thick orange-yellow gel formed after about 5 minutes.

After overnight reaction, the reaction mixture is washed with EtOH and filtered. The amber solution is reduced in volume. EtOH is added causing a dark yellow precipitate to form. This solid is filtered and suction-dried.

It is noted, again, that where possible, all procedures were performed at 0° C.

A yield of 1.032 g (62.3%) of polymer product was obtained.

EXAMPLES 9-23

Various vinyl isocyanide monomers were homopolymerized along the lines of Examples 7 and 8 using various nickel (II) catalysts. The poly(vinyliminomethylene) homopolymers were characterized upon isolation to obtain the weight-average molecular weight (Mw) and polydispersivity (Mw/Mn). The results obtained are summarized below in Table 1.

EXAMPLE 34

Copolymerization of 2,4,6-$(CH_3)_3C_6H_2$—CH=CH—NC with tert-butyl isocyanide

Amounts Used 1.712 g of 2,4,6-$(CH_3)_3C_6H_2$—CH=NC (10.0 mmol)

0.921 g of t-BuNC (11.1 mmol) —both of the above isocyanides are combined and dissolved in 100 ml EtOH 0.0490 g Ni(acac)$_2$ (0.101 mmol) dissolved in 50 ml EtOH.

To the stirring Ni(acac)$_2$/EtOH solution is added the isocyanide mixture solution. A precipitate - gel forms in about 15 seconds.

After allowing the reaction to proceed for about 24 hours, the gelled mass is filtered and washed with

TABLE 1

POLYMERIZATION OF VINYL ISOCYANIDES TO POLY(VINYLIMINOMETHYLENES) USING NICKEL (II) CATALYSTS

| No. | Vinyl Isocyanide Monomer | Catalyst[a] | Yield, % | Mw | $M_w/M_n$ | $[\eta]$ |
|---|---|---|---|---|---|---|
| 9 | $(CH_3)_3CCH=CHNC$ | $NiCl_2$ | 43 | 71,300 | 1.82 | 0.31 |
| 10 | $(CH_3)_3CCH=CHNC$ | $Ni(acac)_2$ | 48 | 51,200 | 1.91 | 0.26 |
| 11 | $C_6H_5CH=CHNC$ | $NiCl_2$ | 60 | 14,000 | 1.79 | 0.098 |
| 12 | $C_6H_5CH=CHNC$ | $Ni(acac)_2$ | 55 | 11,000 | 1.72 | 0.095 |
| 13 | 2,4,6-$(CH_3)_3C_6H_2CH=CHNC$ | $NiCl_2$ | 83 | insoluble | | |
| 14 | 2,4,6-$(CH_3)_3C_6H_2CH=CHNC$ | $Ni(acac)_2$ | 90 | insoluble | | |
| 15 | $C_6H_5C(CH_3)CH=CHNC$ | $NiCl_2$ | 37 | 42,800 | 2.30 | 0.28 |
| 16 | $C_6H_5C(CH_3)CH=CHNC$ | $NiCl_2$ | 25 | 74,500 | 2.39 | 0.46 |
| 17 | $C_6H_5C(CH_3)CH=CHNC$ | $NiCl_2 \cdot 6H_2O$ | 21 | 46,300 | 2.15 | 0.27 |
| 18 | $C_6H_5C(CH_3)CH=CHNC$ | $NiCl_2 \cdot 6H_2O$ | 29 | 58,700 | 2.32 | 0.35 |
| 19 | $C_6H_5C(CH_3)CH=CHNC$ | $Ni(acac)_2$ | 28 | 40,200 | 2.22 | 0.22 |
| 20 | $C_6H_5C(CH_3)CH=CHNC$ | $Ni(acac)_2$ | 30 | 63,300 | 1.98 | 0.36 |
| 21 | $CH_3CH=C(CH_3)CH=CHNC$ | $NiCl_2$ | 97 | insoluble | | |
| 22 | $CH_3CH=C(CH_3)CH=CHNC$ | $NiCl_2 \cdot 6H_2O$ | 100 | insoluble | | |
| 23 | $CH_3CH=C(CH_3)CH=CHNC$ | $Ni(acac)_2$ | 99 | insoluble | | |

[a] In all of these experiments about 1 mole % of the nickel (II) catalyst was used relative to the isocyanide.

EXAMPLES 24-33

The particular vinyl isocyanide, $(CH_3)_3C$—CH=CH—NC, was prepared from pivalaldehyde and methyl isocyanide in 76% yield using the method of Schöllkopf as described above. The homopolymerization of $(CH_3)_3C$—CH=CH—NC was then investigated under a variety of conditions. The results of these investigations with the recited conditions for each example are listed in Table 2.

EtOH. CHCl$_3$ is added to the solid residue, dissolving some of the solid, but not all. Several filters are required to complete the filtration due to filter clogging. Both medium and coarse filters were used.

Soluble (B) and insoluble portions (A) were obtained. The solution containing the soluble portion is reduced in volume and EtOH is added thereto causing a precipitate to form. This solid is filtered and dried overnight.

Both (A) and (B) were suction-dried overnight. Yield of (A) is 0.750 g (28.5%).

Yield of (B) is 0.449 g (17.1%).

As indicated above, the homopolymers and copolymers of the present invention are used advantageously

TABLE 2

POLYMERIZATIONS OF $(CH_3)_3C$—CH=CH—NC

| Example No. | Catalyst | Solvent | Temp.[a] | Yield | Mw[b] | Mw/M$_n$[b] | Analyses, %[c] | | |
|---|---|---|---|---|---|---|---|---|---|
| | | | | | | | C | H | N |
| 24 | Ni(acac)$_2$, 0.088% | EtOH | R.T. | 52% | 165,000 | 1.8 | 75.5 | 10.2 | 12.6 |
| 25 | Ni(acac)$_2$, 0.20% | EtOH | R.T. | 58% | 144,000 | 1.8 | 76.2 | 10.3 | 12.7 |
| 26 | Ni(acac)$_2$, 0.47% | EtOH | R.T. | 58% | 144,000 | 1.9 | 76.7 | 10.3 | 12.7 |
| 27 | Ni(acac)$_2$, 0.95% | EtOH | R.T. | 48% | 51,000 | 1.9 | 75.1 | 10.1 | 12.5 |
| 28 | Ni(acac)$_2$, 0.94% | EtOH | R.T. | 20% | 145,000 | 1.8 | 74.2 | 10.2 | 12.7 |
| 29 | Ni(acac)$_2$, 0.51% | EtOH | 40° C. | 57% | 150,000 | 1.9 | 76.9 | 10.2 | 12.8 |
| 30 | Ni(acac)$_2$, 0.48% | EtOH | 0° C. | 62% | 270,000 | 1.9 | 76.8 | 10.2 | 12.8 |
| 31 | Ni(acac)$_2$, 0.48% | EtOH | $-78°$ C.$\rightarrow$R.T.[d] | 63% | 400,000 | 3.9 | 76.8 | 10.2 | 12.8 |
| 32 | Ni(dpm)$_2$, 0.50% | EtOH | R.T. | 69% | 97,000 | 2.0 | 76.7 | 10.2 | 12.8 |
| 33 | Ni(dpm)$_2$, 0.48% | hexane | R.T. | 73% | 192,000 | 2.3 | 76.8 | 10.2 | 12.8 |

[a] R.T. = room temperature (25° C.)
[b] Data obtained using gel permeation chromatography
[c] Calculated for $[(CH_3)_3CCH=CHNC]_n$: C, 77.0; H, 10.2; N, 12.8.
[d] Polymerization appeared to begin when the temperature of the reaction reached $-16°$ C.

in the formation of highly conjugated conducting materials. As such the polymers of the present invention can be used in manufactured articles where electroconductivity is required in the manner provided by U.S. Pat. No. 4,304,987 which is specifically incorporated herein by reference in its entirety. Moreover, it is also possible to add various metals and salts thereof to the polymer compositions for enhancing conductivity in the manner provided by U.S. Pat. Nos. 3,867,315 and 3,978,378, which are specifically incorporated herein by reference in their entirety.

Additionally, the polymers of the present invention are used advantageously in the preparation of printed circuits in the manner provided by U.S. Pat. No. 4,371,459 which is specifically incorporated herein by reference in its entirety.

Along these lines, the conductive polymers of the present invention can be fabricated, particularly into thin layered capacitors or printed circuits, with the conductive material being coextruded with dielectric materials using the coextrusion apparatus of U.S. Pat. No. 3,557,265 which is incorporated by reference herein in its entirety.

Having now fully described this invention, it will be apparent to one of ordinary skill in the art that many changes and modifications can be made thereto without departing from the spirit or scope of the invention as set forth herein.

What is claimed as new and desired to be secured by Letters Patent of the United States is:

1. A poly(vinyliminomethylene) homopolymer having the formula:

$$[RR'C=C(R'')N=C<]_n$$

wherein R and R', which are the same or different, are each hydrogen, a $C_1$-$C_8$ alkyl group or a $C_3$-$C_7$ cycloalkyl group which is unsubstituted or substituted by lower alkyl or alkoxy groups; a $C_2$-$C_8$ alkenyl group or a $C_5$-$C_7$ cycloalkenyl group which is unsubstituted or substituted by lower alkyl or alkoxy groups; a phenyl group or naphthyl group which is unsubstituted or substituted by lower alkyl or alkoxy groups; with the proviso that at least one of R or R' is a substituent other than hydrogen, R'' is hydrogen, and n has a value such that the polymer weight-average molecular weight is in the range of about 2,000 to 400,000 as determined by gel permeation chromatography.

2. The homopolymer according to claim 1, wherein either R or R' or both are a $C_1$-$C_8$ straight-chain or branched-chain alkyl group which is unsubstituted or substituted by lower alkyl or alkoxy groups.

3. The homopolymer according to claim 2, wherein either R or R' or both are a methyl, ethyl, n-propyl, ispropyl, n-butyl or tert-butyl group.

4. The homopolymer according to claim 1, wherein said substituted phenyl group is a 2,4,6-trimethylphenyl group.

5. The homopolymer according to claim 1, wherein said homopolymer has a polydispersivity in the range of 1.7 to 2.4.

6. The homopolymer according to claim 1, wherein said homopolymer has a weight-average molecular weight in the range of 10,000 to 80,000.

* * * * *